United States Patent [19]

Burns et al.

[11] Patent Number: 4,761,458

[45] Date of Patent: Aug. 2, 1988

[54] PRECERAMIC POLYCARBOSILANE DERIVATIVES

[75] Inventors: Gary T. Burns; Paul P. Lu; Gregg A. Zank, all of Midland, Mich.

[73] Assignee: Dow Corning Corporation, Midland, Mich.

[21] Appl. No.: 85,826

[22] Filed: Aug. 17, 1987

[51] Int. Cl.$^4$ .......................................... C08F 283/00
[52] U.S. Cl. ..................... 525/474; 525/475; 556/435; 528/10; 528/24; 528/25; 528/28; 528/29; 528/31; 528/35
[58] Field of Search ...................... 501/88; 528/10, 24, 528/25, 28, 35, 29, 31; 525/474, 475; 556/435

[56] References Cited

U.S. PATENT DOCUMENTS

| | | |
|---|---|---|
| 4,052,430 | 10/1977 | Yajima . |
| 4,100,233 | 7/1978 | Yajima . |
| 4,220,600 | 9/1980 | Yajima . |
| 4,283,376 | 8/1981 | Yajima . |
| 4,377,677 | 3/1983 | Iwai . |
| 4,404,153 | 9/1983 | Gaul, Jr. ............................ 501/88 |
| 4,414,403 | 11/1983 | Schilling . |
| 4,537,942 | 8/1985 | Brown-Wensley ................. 528/25 |
| 4,645,807 | 2/1987 | Seyferth et al. .................. 525/474 |
| 4,650,837 | 3/1987 | Seyferth . |

OTHER PUBLICATIONS

Yajima, et al, J. Mat. Sci, 13, 2569, (1978).
Yajima, Bull. Amer. Ceram. Soc., 62, 893, (1983).
Hasegawa, et al, J. Mat. Sci. 18, 3633, (1983).
Ichikawa, et al, J. Mat. Sci Letter, 6, 420 (1987).

*Primary Examiner*—Melvyn I. Marquis
*Attorney, Agent, or Firm*—James E. Bittell

[57] ABSTRACT

Halogenated polycarbosilanes are prepared by reacting a polycarbosilane containing at least 0.1 weight percent Si-H groups with a halogenating reagent selected from the group consisting of chlorine, bromine, phosphorous pentachloride, phosphorous pentabromide, antimony pentachloride, N-chlorosuccinimide, N-bromosuccinimide, sulfonyl chloride, and mixtures of $CH_eX_f$ and a free radical initiator where e is 0 or 1, f is 3 or 4, the sum (e+f) is 4, and X is chlorine or bromine. The halogenated polycarbosilanes can be further treated to produce other derivatized polycarbosilanes. The halogenated and derivatized polycarbosilanes can be converted to silicon carbide-containing ceramic materials by pyrolysis at elevated temperatures under an inert atmosphere.

37 Claims, No Drawings

PRECERAMIC POLYCARBOSILANE DERIVATIVES

BACKGROUND OF THE INVENTION

This invention relates to the preparation of preceramic polycarbosilane derivatives which are prepared by the halogenation of preceramic polycarbosilanes which contain Si-H groups. These halogenated polycarbosilanes can be further treated to yield other polycarbosilane materials with novel functionalities. The derivatized polycarbosilane materials of this invention can be pyrolyzed at elevated temperatures to yield ceramic materials.

Preceramic polycarbosilanes which can be converted to ceramic materials are known in the art. These polycarbosilanes generally contain units of the general formula

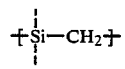

as well as Si-H functionality which may be in the form of

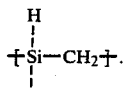

Attempts to incorporate different functional groups in polycarbosilanes via the Si-H units or otherwise have generally been unsuccessful. For example, Seyferth in The Final Scientific Report for Grant No. AF-AFOSR-83-0003 entitled "Organosilicon Compounds and Organosilicon Polymer Intermediates" reported that an attempt to crosslink a liquid Si-H containing polysilane by "chlorination of the Si-H bonds followed by reaction with ammonia" was unsuccessful. Details of this attempted chlorination were not given.

Based on the prior art, the Si-H groups in polycarbosilanes appear to be generally unreactive. Preceramic fibers prepared from polycarbosilanes of the prior art generally require curing by oxygen at temperatures of about 170° C. or more to render them infusible prior to pyrolsis. See, for example, Yajima et al., J. Mat. Sci., 13, 2569 (1978), Yajima, Bull Amer. Ceram. Soc., 62, 893 (1983), Hasegawa et al., J. Mat. Sci., 18, 3633 (1983), and Ichikawa et al., J. Mat. Sci. Lett., 6, 420 (1987). In the Bull. Amer. Ceram. Soc. article Yajima prepared ceramic fibers from polycarbosilanes which had been rendered infusible prior to pyrolysis by heating in air at 190° C. The resulting fibers contained 15.5 weight percent oxygen most of which was thought to be incorporated into the fiber during the curing step. In the J. Mat. Sci. Lett. article, Ichikawa prepared ceramic fibers from polycarbosilanes which had been rendered infusible prior to pyrolysis by heating in air at 170°-200° C. for 0.50-2.0 hours. The cured fibers contained about 9-15 weight percent oxygen whereas the resulting ceramic fibers contained about 9-18 weight percent oxygen. Ichikawa also reported that the polycarbosilane fibers must contain at least about nine weight percent oxygen to survive the pyrolysis step without melting or fusing.

Other polycarbosilanes are known in the art. Verbeek et al. in German Application Publication No. 2,236,078, which is hereby incorporated by reference, prepared ceramic materials by firing a polycarbosilane prepared by the pyrolysis of monosilanes at elevated temperatures in an inert atmosphere.

Yajima et al. in U.S. Pat. Nos. 4,052,430 (Oct. 4, 1977) and 4,100,233 (July 11, 1978), which are both hereby incorporated be reference, prepared ceramic fibers by the pyrolysis of polycarbosilanes in an inert atmosphere or in a vacuum at an elevated temperature. The preceramic fibers could be rendered infusible prior to pyrolysis by treatment with an oxidizing gas (including air, ozone, oxygen, chlorine, and bromine) at a temperature of 50° to 400° C. whereby an oxide layer was formed on the fiber surface. The polycarbosilanes were prepared by thermally decomposing and polycondensing polysilanes.

Yajima et al. in U.S. Pat. Nos. 4,220,600 (Sept. 2, 1980) and 4,283,376 (Aug. 11, 1981), which are both hereby incorporated be reference, prepared ceramic materials by the pyrolysis of polycarbosilanes partly containing siloxane bonds at an elevated temperature under an inert atmosphere or a vacuum. These polycarbosilanes were prepared by heating polysilanes in the presence of about 0.01 to 15 weight percent of a polyborosiloxane in an inert atmosphere.

Iwai et al. in U.S. Pat. No. 4,377,677 (Mar. 22, 1983), which is hereby incorporated by reference, also produced ceramic materials by the pyrolysis of polycarbosilanes at elevated temperatures under an inert atmosphere or vacuum. The polycarbosilanes of Iwai were prepared by heating a polysilane at 50°-600° C. in an inert gas, distilling out a low molecular weight polycarbosilane fraction and then polymerizing the distilled fraction at 250° to 500° C. in an inert atmosphere.

Schilling et al. in U.S. Pat. No. 4,414,403 (Nov. 8, 1983), which is hereby incorporated by reference, produced ceramic material by the pyrolysis of branched polycarbosilanes at elevated temperatures under an inert atmosphere or vacuum. The branched polycarbosilanes were prepared by reacting monosilanes with an active metal in an inert solvent at elevated temperatures where at least some of the monosilanes contain vinyl groups or halomethyl groups capable of forming branching during the polymerization. The branched polycarbosilanes produced were not described as containing either vinyl groups or halomethyl groups.

More recently, Seyferth in U.S. Pat. No. 4,650,837 (Mar. 17, 1987) reported the reaction of a polycarbosilane with an alkali metal silylamide. The resulting polycarbosilane gave higher ceramic yields than did the original polycarbosilane.

What has been discovered are new polycarbosilanes which contain halogen or other functional groups. These new polycarbosilanes may be produced by a simple and convenient method. The new polycarbosilane materials may be converted into ceramic materials by pyrolysis at elevated temperatures.

THE INVENTION

This invention relates to a halogenated polycarbosilane consisting essentially of

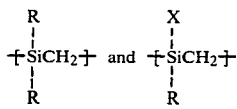

units where each R is independently selected from the group consisting of alkyl groups containing 1 to 4 carbon atoms, where X is chlorine or bromine, and where X is present at about 0.1 to 80 weight percent. It is generally preferred that R is a methyl radical.

This invention also relates to a method of preparing a halogenated polycarbosilane, which method comprises treating a polycarbosilane with a halogenating agent selected from the group consisting of chlorine, bromine, $PCl_5$, $PBr_5$, $SbCl_5$, N-chlorosuccinimide, N-bromosuccinimide, $SOCl_2$, and a mixture of $CH_eX_f$ and a free radical initiator where e is 0 or 1, f is 3 or 4, the sum (e+f) is 4, and X is chlorine or bromine, where the polycarbosilane contains at least 0.1 weight percent Si-H groups, and thereafter separating the halogenated polycarbosilane.

This invention also relates to a method of preparing a R' radical-containing polycarbosilane, which method consists of reacting under anhydrous conditions, a halogenated polycarbosilane with a Grignard reagent having the general formula R'MgX' or an organolithium compound having the general formula R'Li where X' is chlorine, bromine, or iodine and R' is an alkyl radical containing 1 to 20 carbon atoms, a vinyl radical, or a phenyl radical, at a temperature of 0° to 120° C., in a suitable solvent, and thereafter recovering the R' radical-containing polycarbosilane.

This invention also relates to a method of preparing a R"O- or RO-containing polycarbosilane, which method consists of reacting under anhydrous conditions, a halogenated polycarbosilane with a reagent selected from the group consisting of (i) carbinols having the general formula R"OH, (ii) alcoholates having the general formula R"OM, and (iii) alkyl orthoformates having the general formula $(RO)_3CH$ wherein R" is an alkyl radical containing 1 to 4 carbon atoms or a phenyl radical, R is an alkyl radical containing 1 to 4 carbon atoms, and M is sodium, potassium, or lithium, at a temperature of 0° to 110° C., in a suitable solvent, and thereafter recovering the R"O- or RO-containing polycarbosilane.

This invention also relates to a method of preparing a R'''$_2$N-containing polycarbosilane, which method consists of reacting under anhydrous conditions, a halogenated polycarbosilane with an aminolysis reagent having the general formula NHR'''$_2$ wherein R''' is hydrogen, an alkyl radical containing 1 to 4 carbon atoms, a phenyl radical or a -SiR$^{iv}$$_3$ radical wherein R$^{iv}$ is an alkyl radical containing 1 to 4 carbon atoms, a vinyl radical, or a phenyl radical, at a temperature of from 25° to 100° C., in a suitable solvent, and thereafter recovering the R'''$_2$N-containing polycarbosilane.

This invention still further relates to a method of preparing a silicon carbide-containing ceramic article, said method comprising (A) forming an article of the desired shape from a halogenated polycarbosilane; and (B) heating the article formed in (A) in an inert atmosphere or in a vacuum to an elevated temperature greater than 800° C. until the halogenated polycarbosilane is converted to silicon carbide-containing ceramic article; where the halogenated polycarbosilane is prepared by treating a preceramic polycarbosilane with a halogenting agent selected from the group consisting of chlorine, bromine, $PCl_5$, $PBr_5$, $SbCl_5$, N-chlorosuccinimide, N-bromosuccinimide, $SOCl_2$, and a mixture of $CH_eX_f$ and a free radical initiator where e is 0 or 1, f is 3 or 4, the sum (e+f) is 4, and X is chlorine or bromine, where the preceramic polycarbosilane contains at least 0.1 weight percent Si-H groups.

This invention still further relates to a method of preparing a silicon carbide-containing ceramic article, said method comprising (A) forming an article of the desired shape from a R' radical-containing polycarbosilane; and (B) heating the article formed in (A) in an inert atmosphere or in a vacuum to an elevated temperature greater than 800° C. until the R' radical-containing polycarbosilane is converted to silicon carbide-containing ceramic article; where the R' radical-containing polycarbosilane is prepared by reacting under anhydrous conditions, a halogenated polycarbosilane with a Grignard reagent having the general formula R'MgX' or an organolithium compound having the general formula R'Li where X' is chlorine, bromine, or iodine and R' is an alkyl radical containing 1 to 20 carbon atoms, a vinyl radical, or a phenyl radical, at a temperature of 0° to 120° C., in a suitable solvent.

This invention still further relates to a method of preparing a silicon carbide-containing ceramic article, said method comprising (A) forming an article of the desired shape from a R"O- or RO-containing polycarbosilane; and (B) heating the article formed in (A) in an inert atmosphere or in a vacuum to an elevated temperature greater than 800° C. until the R"O- or RO-containing polycarbosilane is converted to silicon carbide-containing ceramic article; where the R"O- or RO-containing polycarbosilane is prepared by reacting under anhydrous conditions, a halogenated polycarbosilane with a reagent selected from the group consisting of (i) carbinols having the general formula R"OH, (ii) alcoholates having the general formula R"OM, and (iii) alkyl orthoformates having the general formula $(RO)_3CH$ wherein R" is an alkyl radical containing 1 to 4 carbon atoms or a phenyl radical, R is an alkyl radical containing 1 to 4 carbon atoms, and M is sodium, potassium, or lithium, at a temperature of 0° to 110° C., in a suitable solvent.

This invention still further relates to a method of preparing a silicon carbide-containing ceramic article, said method comprising (A) forming an article of the desired shape from a R'''$_2$N-containing polycarbosilane; and (B) heating the article formed in (A) in an inert atmosphere or in a vacuum to an elevated temperature greater than 800° C. until the R'''$_2$N-containing polycarbosilane is converted to silicon carbide-containing ceramic article; where the R'''$_2$N-containing polycarbosilane is prepared by reacting under anhydrous conditions, a halogenated polycarbosilane with an aminolysis reagent having the general formula NHR'''$_2$ wherein R''' is hydrogen, an alkyl radical containing 1 to 4 carbon atoms, a phenyl radical or a -SiR$^{iv}$$_3$ radical wherein R$^{iv}$ is an alkyl radical containing 1 to 4 carbon atoms, a vinyl radical, or a phenyl radical, at a temperature of from 25° to 100° C., in a suitable solvent. This ceramic material may contain silicon nitride in addition to silicon carbide because of the presence of nitrogen.

The polycarbosilane starting materials suitable for use in this present invention must contain at least 0.1 weight percent Si-H groups. The Si-H groups are generally thought to be in the form of

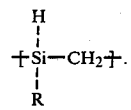

Therefore polycarbosilanes suitable for use in this invention contain both

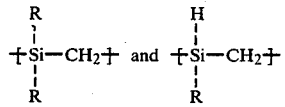

units where each R is independently selected from the group consisting of alkyl radicals containing 1 to 4 carbon atoms. Polycarbosilanes where R is methyl are generally preferred. It is generally preferred that the polycarbosilane contain between 0.2 and 2.0 weight percent Si-H groups. These polycarbosilanes contain Si and C as the main skeleton elements. Other skeletal elements may also be present. The polycarbosilanes useful in this invention may also contain oxygen as a skeleton element in addition to Si and C as the main skeleton elements but it is preferred that the oxygen content of the polycarbosilane be kept to a minimum. It is preferred that the amount of oxygen present is less than about 5 weight percent and most preferably less than 1 weight percent. Where low oxygen-containing ceramic materials are desired, the oxygen content of the polycarbosilanes should be kept to a minimum. Other elements may also be present as main skeleton elements in addition to Si, C and O. However, these other elements should be present at less than about 1 weight percent and preferably only be present at trace levels (i.e. less than 0.1 weight percent).

Suitable polycarbosilane starting materials may be prepared by methods well known in the art. For example, suitable polycarbosilanes may be prepared from monosilanes by pyrolysis at 400° to 1200° C. as described by Verbeek et al. in German Application Publication No. 2,236,078. Suitable polycarbosilanes may also be prepared from polysilanes by heating and polycondensing the polysilanes at 300° to 2000° C. under an inert atmosphere or vacuum as described by Yajima et al., in U.S. Pat. Nos. 4,052,430 and 4,100,233. Other suitable polycarbosilanes may be prepared by heating a mixture of polysilanes with about 0.01 to 15 weight percent of a phenylborosiloxane under an inert atmosphere as described in Yajima et al. in U.S. Pat. Nos. 4,220,600 and 4,283,376. Still other suitable polycarbosilanes may be prepared by the method of Iwai et al. U.s. Pat. No. 4,377,677 wherein an improved procedure for preparing polycarbosilanes from polysilanes is disclosed. Other polycarbosilanes containing the required SiH groups and capable of being converted to ceramic material by pyrolysis at elevated temperatures under an inert atmosphere or vacuum are also useful in the present invention.

Preferred polycarbosilane starting materials for the practice of this invention are prepared from the thermal decomposition and polycondensation of polysilanes as described in U.S. Pat. No. 4,052,430 and 4,100,233.

More preferred polycarbosilane starting materials are prepared by thermally decomposing and polycondensing a polysilane or mixture or polysilanes by heating said polysilane or mixture of polysilanes at a temperature of 300° to 2000° C. in an inert gas, hydrogen, or vacuum wherein said polysilane or polysilanes are selected from the group consisting of cyclic polysilanes of the general formula $(R^1R^2Si)_n$ and linear polysilanes of the general formula

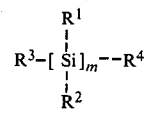

where n is greater than or equal to 4; where m is greater than or equal to 2; and where $R^1$, $R^2$, $R^3$, and $R^4$ are independently selected from the group consisting of hydrogen, alkyl groups containing 1 to 4 carbon atoms, phenyl, —Si($R^5$)$_3$ groups where $R^5$ is a alkyl group containing 1 to 4 carbon atoms, and halogen atoms. Examples of $R^1$, $R_2$, $R^3$, and $R^4$ as alkyl groups and $R^5$ include methyl, ethyl, propyl and butyl groups. Examples of $R^1$, $R^2$, $R^3$, and $R^4$ as halogens include chlorine and bromine with chlorine being preferred. The most preferred polycarbosilanes are prepared by the thermal decomposition and polycondensation of dodecamethylcyclohexasilane or polydimethylsilane.

One especially preferred polycarbosilane starting material can be obtained commercially from Nippon Carbon Co., Ltd., 2-6-1, Hachi-Chobari, Chuo-Ku, Tokyo 104, Japan or Dow Corning Corporation, Midland, Mich.

The actual method of preparing the polycarbosilanes for use as starting materials in this invention is not critical so long as the resulting polycarbosilanes contain at least 0.1 weight percent Si-H groups. Generally, however, the polycarbosilane starting materials should themselves be capable of being converted to silicon carbide-containing ceramics upon prolysis to elevated temperatures in an inert atmosphere or vacuum. Preferably the polycarbosilane starting materials used in the practice of this invention have a softening point of about 50° to 300° C. and most preferably in the range of 70° to 200 C.

The halogenating agents suitable for use in this invention include chlorine, bromine, phosphorous pentachloride, phosphorous pentabromide, antimony pentachloride, N-chlorosuccinimide, N-bromosuccinimide, sulfonyl chloride, and mixtures of $CH_eX_f$ and a free radical initiator where e is 0 or 1, f is 3 or 4, the sum (e+f) is 4, and X is chlorine or bromine. Generally, chlorine and bromine are preferred as the halogenating agent with chlorine being most preferred. Combinations of halogenating agents may be used if desired.

As noted above, a mixture of a halogenated methane, $CH_eX_f$, and a free radical initiator, where e is 0 or 1, f is 3 or 4, the sum (e+f) is 4, and X is chlorine or bromine, may be used as the halogenating agent. The halogenated methane may be $CCl_4$, $CHCl_3$, $CBr_4$, or $CHBr_3$. Suitable free radical initiators are well known in the art. Examples of such free radical initiators include peroxides such as benzoyl peroxide, 2,4-dichlorobenzoyl peroxide, bicumyl peroxide, and the like. Normally the mixture of the halogenated methane and free radical initiator should contain about 0.1 to 10 mole percent of the free radical initiator. Typically, the molar amount of the free radical initiator present should be greater than the molar amount of Si-H groups present in the polycarbosilane. However, other levels of the free radical initiator may be used if desired.

Generally, the halogen content in the halogenated polycarbosilanes of this invention can be in the range of about 0.1 to 80 percent. The actual halogen content will depend on variables such as the actual halogenating agent used, the reaction temperature and duration, and like factors. As noted below, it is generally preferred that all the Si-H groups are halogenated and that relatively few of the organic groups in the polycarbosilane be halogenated. But, again, as noted below, halogenation of the organic groups does not appear to interfere with the usefulness of the halogenated polycarbosilanes of this invention. When the halogen is chlorine, it is generally preferred that the halogenated polycarbosilane contain about 0.5 to about 35 weight percent chlorine. When the halogen is bromine, it is generally preferred that the halogenated polycarbosilane contain about 0.5 to about 55 weight percent bromine. Chlorine is the preferred halogenating agent.

The halogenated polycarbosilane materials of this invention are prepared by contacting the starting polycarbosilane materials in a solvent with the desired halogenating agent. Suitable solvents include the halogenated hydrocarbon solvents such as carbon tetrachloride. Other "inert" organic solvents may used. By "inert" solvent we mean a solvent that does not react with either the polycarbosilanes or the halogenating agents or otherwise interfere with the reaction between the polycarbosilane and the halogenating agent.

Although not wishing to be limited by theory, halogenation is thought to occur via two general reactions:

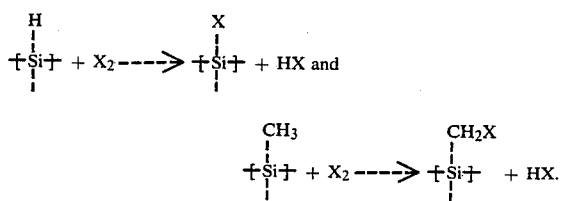

The hydrogens in the Si-H groups should be more reactive and thus should be replaced first. Therefore, it is desirable to control the reaction so that the first reaction will predominate. Additionally, this halogenating reaction is exothermic; thus cooling may be required to control the reaction. As noted, halogenation appears to continue after the hydrogen of the Si-H groups has reacted. Although this additional halogenation does not appear to interfere with conversion of the halogenated polycarbosilane to either ceramic materials or to other derivatized polycarbosilane, it is preferred that the reaction is controlled to limit the halogenation of groups other than Si-H. To this end, the halogenating reaction is generally carried out in a solvent at temperatures less than 50° C. It is preferred, however, that the reaction be carried out at approximately 0-5° C., or lower. The use of phosphorous pentachloride, phosphorous pentabromide, antimony pentachloride, N-chlorosuccinimide, N-bromosuccinimide, sulfonyl chloride or mixtures of $CH_eX_f$ and a free radical initiator where e is 0 or 1, f is 3 or 4, the sum (e+f) is 4, and X is chlorine or bromine, may require higher temperatures. When chlorine or bromine gas is used as the halogenating agent, it is preferred that the halogenating agent be slowly introduced into a solution of the polycarbosilane at a temperature of 5° C. or less. Although not required, it is generally preferred that the reaction take place in the dark. The use of dark avoids the possibility of undesirable side reactions; the potential occurrence of undesirable side reactions in the presence of light have not been investigated. The reaction may be allowed to proceed to desired halogen content by control of the reaction time and other variables. When chlorine is used, a reaction time of about 30 to 60 minutes is generally sufficient. After achieving the desired halogen content, the halogenated polycarbosilane is separated from the reaction mixture. Standard separation techniques may be used. It is preferred that any excess halogenating agent and by-product HX be first removed from the reaction mixture. This can be accomplished by bubbling an inert gas through the reaction mixture; other techniques may be used as will be apparent to one skilled in the art. The halogenated polycarbosilane may be freed of solvent by, for example, vacuum stripping. Complete removal of the solvent is generally not required for further processing. However, if the halogenated polycarbosilane is to be further treated with either a Grignard reagent or an organolithium compound, any halogenated solvent must be removed to avoid interference with the derivatization reaction.

The halogenated polycarbosilanes of this invention may be converted to ceramic materials by pyrolysis to elevated temperatures. They may also be converted to other preceramic polycarbosilanes with various functional groups. These derivatized polycarbosilanes may then be converted to ceramic materials by pyrolysis at elevated temperatures.

One such derivatized polycarbosilane which can be prepared by the practice of this invention is a R' radical-containing polycarbosilane were R' is an alkyl radical containing 1 to 20 carbon atoms, a vinyl radical, or a phenyl radical. The R' radical-containing polycarbosilane is prepared by reacting a halogenated polycarbosilane, under anhydrous conditions, with a Grignard reagent of general formula R'MgX' or with an organolithium compound of general formula R'Li where R' is an alkyl radical containing 1 to 20 carbon atoms, a vinyl radical, or a phenyl radical and X' is chlorine, bromine, or iodine. The incorporation of R' groups containing greater than about six carbon atoms appear to result in a lowering of the softening temperature of the derivatized polycarbosilane.

The Grignard reagents useful herein are those reagents commonly known in the art for Grignard type reactions. Such materials are, for example, alkyl magnesium halides and aryl magnesium halides. For purposes of this invention, it is preferred to use Grignard reagents having the general formula R'MgX' wherein R' is an alkyl radical of 1 to 20 carbon atoms, a vinyl radical or a phenyl radical and X' is either chlorine bromine, or iodine. Most preferred Grignard reagents are $CH_3MgCl$, $(CH_2=CH)MgCl$ and $(C_6H_5)MgCl$. Typical Grignard reaction solvents can be used herein. Preferred are alkyl ethers and tetrahydrofuran.

The organolithium compounds useful herein are of the general formula R'Li wherein R' is an alkyl radical of 1 to 20 carbon atoms, a vinyl radical, or a phenyl radical. Suitable solvents for the organolithium compounds include toluene, xylene, benzene, tetrahydrofuran, and ethers.

Combinations of Grignard reagents and/or organolithium compounds may also be used.

For best results, dry reaction conditions should be observed. Solvents for the halogenated polycarbosilane can be any organic solvent in which the material is soluble and which does not react with the material except in the desired manner. Examples of useful solvents include toluene, xylene, benzene, tetrahydrofuran and ethers. Specifically, toluene is preferred. Generally it has been found preferable to add the halogenated polycarbosilane to an excess of Grignard reagent or organolithium compound, both in a solvent solution. This addition and reaction is carried out while the materials are stirred or otherwise agitated. The reaction is carried out in a dry inert atmosphere such as in the presence of nitrogen or argon gas to prevent the introduction of water into the reaction vessel. The reaction can be run at temperatures of 0° to 120° C. but preferably the reaction is run at room temperature or slightly below room temperature to prevent or decrease undesirable side reactions. After the addition of the reagent is complete, the reaction mixture is stirred for a time, with or without heating, to ensure the completion of the reaction. Typically the reaction is carried out for a time period of about 1 to 48 hours. Excess Grignard reagent or organolithium compound is then destroyed using water, HCl or an alcohol. The reaction mixture is cooled to room temperature and then filtered by conventional means and the solvents and other volatile materials are then removed by stripping under vacuum with the addition of heat. Other separating techniques will be apparent to those skilled in the art. The resulting R' radical-containing polycarbosilanes are generally solids at room temperature.

Another derivatized polycarbosilane is a R"O- or RO-containing polycarbosilane which may be prepared by reacting a halogenated polycarbosilane, under anhydrous conditions, with a reagent selected from the group consisting of (i) carbinols having the general formula R"OH, (ii) alcoholates having the general formula R"OM, and (iii) alkyl orthoformates having the general formula $(RO)_3CH$ where R" is an alkyl radical containing 1 to 4 carbon atoms or a phenyl radical, R is an alkyl radical containing 1 to 4 carbon atoms, and M is sodium, potassium, or lithium.

The treating reagents are of three different types; namely, carbinols having the general formula R"OH; alcoholates having the general formula R"OM and alkyl orthoformates having the general formula $(RO)_3CH$ in which R" is an alkyl group of 1–4 carbon atoms and phenyl, R is an alkyl group of 1–4 carbon atoms, and M is sodium, potassium or lithium. Specific examples of materials useful in this invention are $CH_3OH$, $CH_3CH_2OH$, $CH_3(CH_2)_3OH$, $NaOCH_3$, $KOCH_3$, $LiOCH_2CH_3$, $(CH_3O)_3CH$, $(CH_3CH_2O)_3CH$ and phenol. Preferred for this invention are the alkyl orthoformates and alcoholates. Most preferred is $NaOCH_3$. A combination of these reagents may also be employed.

Generally, the reagent is used in a stoichiometric excess based on the amount of halogen present in the halogenated polycarbosilane to ensure that the alcoholysis reaction is enhanced. Excess reagent as well as any solvents and by-products can be stripped or strip distilled at the end of the reaction. Naturally, alcoholates must be converted to the corresponding alcohol before being removed by stripping.

For best results, dry reaction conditions should be observed. Solvents for the halogenated polycarbosilanes can be any organic solvent in which the material is soluble and which does not react with the material except in the desired manner. Examples of useful solvents include toluene, xylene, benzene tetrahydrofuran and ethers. Specifically, toluene is preferred. Generally, the order of addition of the components is not critical, but it has been found preferable to add the neat reagent to the halogenated polycarbosilane in a solvent solution, such as toluene. The addition and reaction is carried out while the materials are stirred or otherwise agitated. The reaction is carried out in a dry inert atmosphere such as in the presence of nitrogen or argon gas to prevent the introduction of water into the reaction vessel. After the addition of the reagent is complete, the reaction mixture is stirred for a time, with or without heating, to ensure the completion of the reaction. Typically the reaction time is about 1.5 to 65 hours. The reaction can be run at temperatures of 25° to 110° C. but preferably the reaction is run at reflux temperature. The reaction mixture is cooled to room temperature and then filtered by conventional means and the solvents and other volatile materials are then removed by stripping under vacuum with or without the addition of heat. Other separating techniques will be apparent to those skilled in the art. The resulting R"O- or RO-containing polycarbosilanes are generally solids at room temperature.

Another derivatized polycarbosilane may be prepared by reacting a halogenated polycarbosilane, under anhydrous conditions, with an aminolysis reagent of general formula $NHR'''_2$ wherein R''' is hydrogen, an alkyl radical containing 1 to 4 carbon atoms, a phenyl radical, or a $—SiR^{iv}_3$ radical where $R^{iv}$ is an alkyl radical containing 1 to 4 carbon atoms, a vinyl radical, or a phenyl radical.

The aminolysis reagents useful in this invention are ammonia or organic amines having the general formula $NHR'''_2$ where R''' is an alkyl radical of 1 to 4 carbon atoms, a phenyl radical, or a $—SiR^{iv}_3$ radical where $R^{iv}$ is an alkyl radical of 1 to 4 carbon atoms, a vinyl radical, or a phenyl radical. Each R''' in the general formula $NHR'''_2$ may be the same radical or they may be different radicals. Examples of such materials include $NH_3$, $CH_3NH_2$, $C_4H_9NH_2$, $(CH_3)_2NH$, and aniline. Most preferred are $C_4H_9NH_2$ and aniline. Combinations of these aminolysis reagents may also be employed. Generally, the aminolysis reagent is used in a stoichiometric excess based on the amount of halogen present in the halogenated polycarbosilane to ensure that the aminolysis reaction is enhanced. Excess reagent as well as any solvents and by-products can be stripped or strip distilled at the end of the reaction.

For best results, dry reaction conditions should be observed. Solvents for the halogenated polycarbosilane can be any organic solvent in which the material is soluble and which does not react with the material except in the desired manner. Examples of useful solvents include toluene, xylene, benzene, tetrahydrofuran and ethers. Specifically, toluene is preferred. Generally, the order of addition of the components is not critical, but it has been found preferable to add the neat aminolysis reagent to the halogenated polycarbosilane in a solvent solution, such as toluene. This addition and reaction is carried out while the materials are stirred or otherwise agitated. The reaction is carried out in a dry inert atmosphere such as in the presence of nitrogen or argon gas to prevent the introduction of water into the reaction vessel. After the addition of the aminolysis reagent is complete, the reaction mixture is stirred for a time, with or without heating, to ensure the completion of the reaction. Typically the reaction time is about 3 to 96 hours. The reaction can be run at temperatures of 25° to 100° C. but preferably the reaction is run at reflux temperature. The reaction mixture is cooled to room temperature and then filtered by conventional means and the solvents and other volatile materials are then removed by stripping under vacuum with or without the addition of heat. Other separating techniques will be apparent to those skilled in the art. The resulting R'''$_2$N-containing polycarbosilanes are generally solids at room temperature.

The halogenated polycarbosilanes and derivatized polycarbosilanes of this invention may be converted to ceramic materials by pyrolysis to elevated temperatures. The preceramic polycarbosilane composition is fired to an elevated temperature of at least 750° C. in an inert atmosphere or vacuum until the mixture is converted to a ceramic material. Preferably the pyrolysis temperature is from about 1000° to 1600° C. If the preceramic polycarbosilane composition is of sufficient viscosity or if it possesses a sufficiently low melt temperature, it can be shaped, rendered infusible, and then finally pyrolyzed to give a ceramic shaped article such as a fiber. Preferably the preceramic polycarbosilane compositions used in the practice of this invention have a softening temperature of about 50° to 300° C. and most preferably in the range of 70° to 200° C. Such a softening temperature allows for the formation of preceramic fibers by known spinning techniques. The halogenated polycarbosilanes and derivatized polycarbosilanes of this invention may also be used to prepare silicon carbide containing ceramic materials such as films, coatings, composites, and other shaped articles. The halogenated polycarbosilanes and derivatized polycarbosilanes may be used as binders and infiltrants in the production of various ceramic materials.

So that those skilled in the art can better appreciate and understand the invention, the following examples are given. Unless otherwise indicated, all percentages are by weight. Unless otherwise indicated, all procedures were carried out in an inert atmosphere (generally argon or nitrogen) or under a vacuum.

The polycarbosilane used was from Nippon Carbon Company Ltd, 2-6-1, Hachi-Chobari, Chuo-Ku, Tokyo 104, Japan and was used as received. This polycarbosilane is thought to have been prepared from the sodium coupling of dimethyldichlorosilane followed by the thermal decomposition and polycondensation of the resulting polydimethylsilane as described in Yajima et al., *J. Mat. Sci.*, 13, 2569 (1978), Yajima, *Bull. Amer. Ceram. Soc.*, 62, 893 (1983), and U.S. Pat. Nos. 4,052,430 and 4,100,233. The Si-H content was 0.8 weight percent as determined by proton NMR; percent Si-H is the percent hydrogen directly attached to silicon. Throughout this specification, the terms "percent Si-H" or "percent Si-H groups" are used to mean the weight percent hydrogen which is directly attached to silicon. The polycarbosilane contained 0.73 weight percent oxygen. All oxygen analyses were determined using a Leco Oxygen Analyzer equipped with an Oxygen Determinator 316 (Model 783700) and a Electrode Furnace EF100 (Model 77600) manufactured by Leco Corporation, St. Joseph, Mich. Elemental analysis of the polycarbosilane was 40.5 weight percent carbon, 8.30 weight percent hydrogen, 0.07 weight percent nitrogen, and 49.9 weight percent silicon. Silicon was determined by a fusion technique which consisted of converting the silicon material to soluble forms of silicon and then analyzing the soluble material quantitatively for total silicon by atomic absorption spectrometry. Carbon, hydrogen, and nitrogen were determined on a C, H, N Elemental Analyzer, Model 240-XA, manufactured by Control Equipment Corporation of Lowell, Mass. Proton NMR (CDCl$_3$ solution) gave broad peaks at $-0.5$ to 1.5 ppm for C-H protons and at 4.0 to 5.0 ppm for Si-H protons. Silicon-29 NMR gave broad peaks at 0.0 (SiC$_4$) and $-16.0$ ppm (Si-H). All NMR spectra were recorded on a Model EM-390 NMR or spectrometer from Varian Associates of Palo Alto, Calif.; all NMR chemical shift data is reported as delta values (ppm). IR analysis (KBr plates with film of polycarbosilane cast from hexane solution) indicated absorptions at 740 and 830 cm$^{-1}$ (SiCH$_3$), 1020 and 1355 cm$^{-1}$ (SiCH$_2$Si), 2095 cm$^{-1}$ (SiH), 1250, 1400, 2895, and 2953 cm$^{-1}$ (CH$_3$) All IR spectra were recorded on a Model 5DX spectrometer from Nicolet Instrument Corporation of Madison, Wis. The molecular weights were 817 (number average) and 2199 (weight average) as determined by gel permeation chromatography using five weight percent of the polycarbosilane in a tetrahydrofuran solution with a tetrahydrofuran elutant at a flow rate of 1.5 ml/minute and a differential refractometer detector. Molecular weight measurements were relative to a polystyrene standard. The molecular weight polydispersity was 2.7. The polycarbosilane had a softening temperature of 190° C. as determined on a DuPont Instruments Thermoanalyzer Model 1090 equipped with a Model 1091 DuPont Disk Memory and a DuPont Model 940 thermomechanical Analyzer.

Unless indicated otherwise, preceramic polycarbosilanes were converted to ceramic materials by pyrolysis in a Lindberg tube furnace (Model 54434 or 54879) by heating to 1200° C. at a rate of about 3° C./min and holding at 1200° C. for about two hours under an argon atmosphere.

EXAMPLE 1

Polycarbosilane (114.1 g) was added to about 800 ml CCl$_4$, which had been degassed by bubbling argon through the solvent, at about 4° C. in a two liter, three neck flask equipped with a gas inlet, stirrer, and a take-off adaptor. Chlorine gas was bubbled through the reaction mixture in the dark with stirring for about thirty minutes. The chlorine flow was stopped and the reaction mixture was allowed to warm to room temperature. The reaction mixture was degassed with argon for 30 minutes to remove unreacted chlorine gas and the by-product HCl. The solvent was stripped at about 50° C. and 2 mm Hg followed by about 2 hours at 250° C. and 1 mm Hg. The white solid was redissolved in toluene and stripped under the same conditions just mentioned to help ensure the removal of CCl$_4$. A fine white powder (158g, 108 percent yield based on 0.8 percent Si-H in the starting polycarbosilane) was obtained. The halogenated polycarbosilane contained 37.4 weight percent silicon, 34.5 weight percent carbon, 6.03 weight percent hydrogen, undetectable nitrogen, 0.43 weight percent oxygen, and 21.4 weight percent chlorine. The softening temperature was 260° C. Proton and silicon-29 NMR and IR confirmed the absence of Si-H groups in the halogenated polycarbosilane. Proton NMR (CDCl$_3$ solution) gave only a broad peak at $-0.5$ to 1.5 ppm for C-H protons; the peak at 4.0 to 5.0 ppm associated with Si-H in the starting polycarbosilane was absent in the halogenated polycarbosilane. Silicon-29 NMR gave broad peaks at 0.0 and 22.0 ppm; there was no absorption at 31 16.0 ppm associated with Si-H as observed in the starting polycarbosilane. IR analysis of a thin film gave absorptions at 2953(m), 2895(m), 1406(w), 1356(w), 1258(s, sh), 1018(s, br) and 829(vs, br) cm$^{-1}$; there was no absorption at about 2100 cm$^{-1}$ associated with Si-H which was present in the starting polycarbosilane. Pyrolysis of a bulk sample of the halogenated polycarbosilane gave a silicon carbide containing ceramic product (41.7 weight percent ceramic yield) with some evidence of foaming and with an elemental analysis of 55.0 weight percent silicon, 34.6 weight percent carbon, 0.18 weight percent hydrogen, 0.30 weight percent nitrogen, 3.01 weight percent oxygen, and 2.45 weight percent chlorine.

EXAMPLE 2

A sample of the halogenated polycarbosilane of Example 1 (22.4 g) was dissolved in about 200 ml toluene. The solution was cooled to about 0° C. and alkylated with methyllithium (140 ml of a 1.5M solution in diethylether). The methyllithium was added over a 30 minute period and then stirred for 30 minutes. The reaction mixture was allowed to warm up to room temperature. Most of the solvent was removed by distillation at 65° C. The resulting slurry was cooled to about 0° C. at which point 20 ml of a saturated aqueous NH$_4$Cl solution was added, followed by 100 ml distilled water. The organic layer was collected and dried over anhydrous MgSO$_4$. After filtration and stripping (100° C. and 2 mm Hg), an off-white methyl radical-containing polycarbosilane was obtained (14.1 g, 72 percent yield). The resulting derivatized polycarbosilane contained 41.9 weight percent silicon, 42.3 weight percent carbon, 7.76 weight percent hydrogen, undetectable nitrogen, 0.66 weight percent oxygen, and 7.6 weight percent chlorine. IR analysis of a thin film gave absorptions at 2953(m), 2895(m), 1406(w), 1356(w), 1258(s, sh), 1018(s, br) and 843(vs, br) cm$^{-1}$. The molecular weights were 921 (number average) and 2476 (weight average). Pyrolysis of a bulk sample of the derivatized polycarbosilane gave a silicon carbide-containing ceramic product (51.3 weight percent ceramic yield) with some evidence of foaming and with an elemental analysis of 51.9 weight percent silicon, 36.0 weight percent carbon, 0.30 weight percent hydrogen, 0.07 weight percent nitrogen, 2.95 weight percent oxygen, and 5.9 weight percent chlorine.

EXAMPLE 3

A sample of the halogenated polycarbosilane of Example 1 (22.0 g) was dissolved in about 200 ml toluene. The solution was cooled to about 0° C. and alkylated with mixture of methyllithium (50 ml of a 1.5M solution in diethylether) and (CH$_2$=CH)MgBr (130 ml of a 1.0M solution in tetrahydrofuran). The alkylating mixture was added over a 40 minute period and then stirred for 30 minutes. The reaction mixture was allowed to warm up to room temperature. The solvent was partially removed by distillation at 90° C. The resulting slurry (about 170 ml) was cooled to about 0° C. at which point 30 ml of a saturated aqueous NH$_4$Cl solution was added, followed by 100 ml distilled water. The organic layer was collected and dried over anhydrous MgSO$_4$. After filtration and stripping (100° C. and 2 mm Hg), a yellowish-brown methyl and vinyl radical-containing polycarbosilane was obtained (12.2 g, 59 percent yield). The resulting derivatized polycarbosilane contained 38.4 weight percent silicon, 41.7 weight percent carbon, 7.27 weight percent hydrogen, undetectable nitrogen, 0.81 weight percent oxygen, and 10.7 weight percent chlorine. Proton NMR (CDCl$_3$ solution) gave a broad peaks at −0.5 to 1.5 ppm for C-H protons and at 4.5 to 5.8 ppm for vinyl protons with area ratio of 19.3 to 1.0. IR analysis of a thin film gave absorptions at 3044(w), 2953(m), 2903(m), 1406(w), 1355(w), 1258(s, sh), 1018(s, br) and 829(vs, br) cm$^{-1}$. The molecular weights were 1070 (number average) and 3187 (weight average). Pyrolysis of a bulk sample of the derivatized polycarbosilane gave a dense, silicon carbide-containing ceramic product (60.2 weight percent ceramic yield) with an elemental analysis of 48.8 weight percent silicon, 31.9 weight percent carbon, 0.42 weight percent hydrogen, undetectable nitrogen, 2.39 weight percent oxygen, and 8.8 weight percent chlorine.

EXAMPLE 4

A sample of the halogenated polycarbosilane of Example 1 (10.8 g) was dissolved in about 200 ml toluene. The solution was cooled in a dry ice/isopropanol bath. Methylamine was bubbled through the polycarbosilane solution for about 40 minutes. The reaction mixture was allowed to warm up to room temperature overnight and then heated to 50° C. until MeNH$_3$Cl salt formation was observed (about 15 minutes). After filtration and stripping (100° C. and 2 mm Hg), a white CH$_3$NH-containing polycarbosilane was obtained (8.8 g, 83 percent yield). The resulting derivatized polycarbosilane contained 38.6 weight percent silicon, 36.9 weight percent carbon, 7.11 weight percent hydrogen, 3.10 weight percent nitrogen, 2.04 weight percent oxygen, and 8.75 weight percent chlorine. Proton NMR (CDCl$_3$ solution) gave a broad peak at −0.5 to 1.5 ppm for C-H protons and a sharp peak of 2.5 ppm for —NH protons with area ratio of 7.2 to 1.0. IR analysis of a thin film gave absorptions at 3416(w), 2953(m), 2895(m), 2805(m), 1406(w), 1306(w), 1258(s, sh), 1096(m), 1206(s, br) and 829(vs, br) cm$^{-1}$. The molecular weights were 1060 (number average) and 3155 (weight average). Pyrolysis of a bulk sample of the derivatized polycarbosilane gave a dense, silicon carbide-containing ceramic product (61.7 weight percent ceramic yield) with an elemental analysis of 50.9 weight percent silicon, 31.4 weight percent carbon, 0.04 weight percent hydrogen, 2.50 weight percent nitrogen, 1.39 weight percent oxygen, and 10.0 weight percent chlorine.

EXAMPLE 5

A sample of the halogenated polycarbosilane of Example 1 (11.6 g) was dissolved in about 200 ml toluene. The solution was cooled in a ice water bath and treated with 25 ml of methyl orthoformate. The reaction mixture was heated to reflux overnight and then stirred at room temperature for 48 hours. Solvent was removed by distillation at 95° C. followed by vacuum stripping at 100° C. and about 1 mm Hg. A white CH$_3$O-containing polycarbosilane was obtained (9.6 g, 85 percent yield). The resulting derivatized polycarbosilane contained 38.6 weight percent silicon, 33.7 weight percent carbon, 6.06 weight percent hydrogen, undetectable nitrogen, and 19.4 weight percent chlorine. Proton NMR (CDCl$_3$ solution) gave a broad lpeak at −0.4 to 1.5 ppm for C-H protons and a sharp peak at 3.5 ppm for —OCH$_3$ protons with area ratio of 28 to 1.0. IR analysis of a thin film gave absorptions at 2953(m), 2903(m), 1406(w), 1356(w), 1258(s sh), 1026(s, br) and 829(vs, br) cm$^{-1}$. The molecular weights were 1075 (number average) and 2628 (weight average). Pyrolysis of a bulk sample of the derivatized polycarbosilane gave a silicon carbide-containing ceramic product (53.4 weight percent ceramic yield) with some evidence of foaming and with an elemental analysis of 53.6 weight percent silicon, 33.3 weight percent carbon, 0.07 weight percent hydrogen, 0.28 weight percent nitrogen, 5.15 weight percent oxygen, and 4.2 weight percent chlorine.

EXAMPLE 6

A sample of the halogenated polycarbosilane of Example 1 (11.3 g) was dissolved in about 75 ml toluene. The solution was cooled in a ice water bath and treated with (CH$_2$=CH)MgBr (80.5 ml of 1.0M in tetrahydrofuran). The reaction mixture was stirred at room temperature for one hour, heated to reflux for two hours, and then stirred at room temperature for 48 hours. Solvent was removed by distillation. The resulting mixture was hydrolyzed with 10 ml of a saturated aqueous NH$_4$Cl solution, followed by 50 ml distilled water and about 125 ml toluene. The organic layer was collected and dried over anhydrous MgSO$_4$. After filtration and stripping (100° C. and 1.0 mm Hg), an yellow vinyl radical-containing polycarbosilane was obtained (4.5 g, 42 percent yield). The resulting derivatized polycarbosilane contained 44.6 weight percent carbon and 7.4 weight percent hydrogen. Proton NMR (CDCl$_3$ solution) gave a broad peak at about 0.2 ppm for C-H protons and two very broad multiplets, one between 5.11 to 6.41 and the other centered at 4.9 ppm, for protons from vinyl-containing functionalities. The NMR area ratio for non-vinyl to vinyl protons was about 8.8 to 1. IR analysis of a thin film gave absorptions at 3044(w), 2953(m), 2903(m), 2108(w), 1620(w), 1406(w), 1356(w), 1258(s, sh), 1026(s, br) and 829(s) cm$^{-1}$. Pyrolysis (to 1200° C. at a rate of 5° C./min and held at 1200° C. for two hours) of a bulk sample of the derivatized polycarbosilane gave a silicon carbide-containing ceramic product (60.6 weight percent ceramic yield) with an elemental analysis of 47.8 weight percent silicon, 35.5 weight percent carbon, 0.48 weight percent hydrogen, 0.03 weight percent nitrogen, 2.89 weight percent oxygen, and 9.2 weight percent chlorine.

EXAMPLE 7

A n-octyl Grignard reagent was prepared by slowly adding n-octyl iodide (30 g, 0.11 moles) to magnesium (2.4 g, 0.10 moles) in 500 ml degassed diethylether containing a small iodine crystal. The rate of n-octyl iodide addition was sufficient to keep the solution refluxing. After the addition (about 2 hours) the magnesium metal was completely dissolved. The n-octyl Grignard reagent was then added to a halogenated polycarbosilane (50 g, 0.38 moles chlorine) dissolved in 300 ml toluene at about 0° C. The polycarbosilane used was similar to the polycarbosilane of Example 1. The reaction mixture was stirred for about 20 hours at room temperature. The reaction mixture was then cooled to about 0° C. and (CH$_2$=CH)MgBr (0.3 moles of 1.0M in tetrahydrofuran) was added. The reaction mixture was allowed to warm to room temperature and then stirred at room temperature for about 20 hours. The majority of the diethylether and tetrahydrofuran solvents were removed by distillation. The toluene based solution was cooled in ice and then neutralized with 50 ml of saturated aqueous NH$_4$Cl and 200 ml distilled water. The organic layer was collected and dried over anhydrous MgSO$_4$. After filtration and stripping (120° C., <1.0 mm Hg), a yellow solid vinyl- and n-octyl-containing polycarbosilane (41.0 g, 74 weight percent yield) was obtained. The softening temperature was 103° C. The molecular weights were 1868 (number average) and 5500 (weight average). Proton NMR (d$_8$-toluene solution) gave peaks at about 0.27 ppm (broad), 0.9 ppm (broad multiplet), and 1.3 ppm (singlet) for C-H protons and two very broad multiplets, one between 5.1 to 6.4 and the other centered at 4.9 ppm, for protons from vinyl-containing functionalities. The NMR area ratio for non-vinyl to vinyl protons was about 19.1 to 1. IR analysis of a thin film gave absorptions at 3048(w), 2959(m), 2924(m), 2855(m), 1468(w), 1406(w), 1369(w), 1250(m), 1026(m) and 822(s) cm$^{-1}$. Pyrolysis to 1200° C. under an argon atmosphere of a bulk sample of the derivatized polycarbosilane gave a silicon carbide-containing ceramic product (56.0 weight percent ceramic yield) with an elemental analysis of 31.0 weight percent carbon, 0.7 weight percent hydrogen, 10.5 weight percent chlorine, and 3.2 weight percent oxygen.

EXAMPLE 8

A n-dodecyl Grignard reagent was prepared by slowly adding n-dodecyl iodide (6 ml, 0.25 moles) to magnesium (6.0 g, 0.25 moles) in 500 ml degassed diethylether containing a small iodine crystal. The rate of n-dodecyl iodide addition was sufficient to keep the solution refluxing. After the addition (about 2 hours) the magnesium metal was completely dissolved. The n-dodecyl Grignard reagent was then added to a halogenated polycarbosilane (65 g) dissolved in 800 ml toluene at about 0° C. The polycarbosilane used was similar to the polycarbosilane of Example 1. The diethylether solvent was removed by distillation. The reaction mixture was heated to reflux overnight. The reaction mixture was then cooled to about 0° C. and (CH$_2$=CH)MgCl (0.275 moles of 1.0M in tetrahydrofuran) was added. The reaction mixture stirred at 0° C. for one hour, then allowed to warm to room temperature, and then stirred at room temperature for about 48 hours. Volatiles were removed by distillation to 100° C. The toluene based solution was cooled in ice and then neutralized with 50 ml of saturated aqueous NH$_4$Cl and 200 ml distilled water. The organic layer was collected and dried over anhydrous MgSO$_4$. After filtration and stripping (120° C., <1.0 mm Hg), a solid vinyl- and n-dodecyl-containing polycarbosilane (67.6 g, 104 weight percent yield) was obtained. The polycarbosilane contained 2.27 weight percent oxygen. The softening temperature was 44.3° C. The molecular weights were 1448 (number average) and 6167 (weight average). Proton NMR (d$_8$-toluene solution) gave peaks at about 0.3 ppm (broad), 0.9 ppm (broad multiplet), and 1.3 ppm (singlet) for C-H protons and two very broad multiplets, one between 5.4 to 6.7 and the other centered at 5.2 ppm, for protons from vinyl-containing functionalities. The NMR area ratio for non-vinyl to vinyl protons was about 27.1 to 1. IR analysis of a thin film gave absorptions at 2953(m), 2916(m), 2847(m), 1468(w), 1406(w), 1356(w), 1258(m), 1026(m) and 822(s) cm$^{-1}$. Pyrolysis to 1200° C. under an argon atmosphere of a bulk sample of the derivatized polycarbosilane gave a silicon carbide-containing ceramic product (49.1 weight percent ceramic yield) with an elemental analysis of 30.6 weight percent carbon, 0.8 weight percent hydrogen, 15.1 weight percent chlorine, and 3.67 weight percent oxygen.

EXAMPLE 9

Polycarbosilane (10.0 g) and benzoyl peroxide (0.30 g) was dissolved in about 600 ml of CCl$_4$ and refluxed for about 120 hours. The polycarbosilane used was similar to the polycarbosilane of Example 1. The reaction was carried out under argon. Additional amounts of benzoyl peroxide (0.22, 0.22, 0.17, and 0.20 g) were added during the reaction at about 24, 48, 113, and 120 hours, respectively. The solvent was removed by rotary evaporation and the residue dissolved in toluene. The toluene (and residual CCl$_4$) was removed by vacuum distillation and the residue dried under vacuum (1.0 mm Hg) for two hours. A chlorinated polycarbosilane (10.8 g) was obtained with 12.8 weight percent chlorine. IR analysis of a thin film gave absorptions at 2959(m), 2903(m), 2108(w), 1553(m), 1406(w), 1356(w), 1258(s, sh), 1018(s, br) and 829(vs, br) cm$^{-1}$. The weak IR peak at 2108 cm$^{-1}$ indicates that not all the Si-H groups were halogenated using CCl$_4$ and benzoyl peroxide.

EXAMPLE 10

A solution of polycarbosilane (10.8 g) from Example 1 in about 150 ml CCl$_4$ was added dropwise over a 60 minute period to a stirred suspension of PCl$_5$ (13.4 g, 0.06 moles) in about 150 ml CCl$_4$ at room temperature under an argon atmosphere. The resulting solution was refluxed for seventeen hours and cooled to room temperature. After filtration, the solvent was removed under vacuum (150° C., 1.0 mm Hg) and the residue dissolved in toluene and filtered. The toluene (and residual CCl$_4$) was removed by vacuum distillation and the residue dried under vacuum (200° C., 1.0 mm Hg) for 3 hours. A chlorinated polycarbosilane (9.78 g) was obtained with 15.4 weight percent chlorine.

That which is claimed is:

1. A halogenated polycarbosilane consisting essentially of

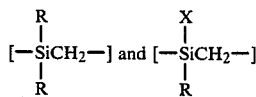

units where each R is independently an alkyl group containing 1 to 4 carbon atoms, where X is chlorine or bromine, and where X is present at about 0.1 to 80 weight percent.

2. A halogenated polycarbosilane as defined in claim 1 where R is methyl, X is chlorine, and X is present at about 0.5 to 35 weight percent.

3. A halogenated polycarbosilane as defined in claim 1 where R is methyl, X is bromine, and X is present at about 0.5 to 55 weight percent.

4. A method of preparing a halogenating polycarbosilane, which method comprises reacting a polycarbosilane with a halogenating agent selected from the group consisting of chlorine, bromine, PCl$_5$, PBr$_5$, SbCl$_5$, N-chlorosuccinimide, N-bromosuccinimide, SOCl$_2$, and mixtures of CH$_e$X$_f$ and a free radical initiator where e is 0 or 1, f is 3 or 4, the sum (e+f) is 4, and X is chlorine or bromine, where the polycarbosilane contains at least 0.1 weight percent Si-H groups, and thereafter separating the halogenated polycarbosilane; where the halogenated polycarbosilane contains 0.1 to 80 weight percent halogen.

5. A method as defined in claim 4 where the halogenating agent is chlorine, where the treatment temperature is less than about 50° C., and where the halogenated polycarbosilane containing 0.5 to 35 weight percent chlorine.

6. A method as defined in claim 5 where the treatment temperature is less than about 5° C.

7. A method as defined in claim 4 where the halogenating agent is bromine and the halogenated polycarbosilane contains 0.5 to 55 weight percent bromine.

8. A method as defined in claim 7 where the treatment temperature is less than about 5° C.

9. A method as defined in claim 4 where the halogenating agent is sulfonyl chloride and the halogenated polycarbosilane contains 0.5 to 35 weight percent chlorine.

10. A method as defined in claim 4 where the halogenating agent is PCl$_5$ or PBr$_5$ and the halogenated polycarbosilane contains 0.5 to 35 weight percent chlorine if the halogen is chlorine or 0.5 to 55 weight percent bromine if the halogen is bromine.

11. A method as defined in claim 4 where the halogenating agent is SbCl$_5$ and the halogenated polycarbosilane contains 0.5 to 35 weight percent chlorine.

12. A method as defined in claim 4 where the halogenating agent is N-chlorosuccinimide or N-bromosuccinimide and the halogenated polycarbosilane contains 0.5 to 35 weight percent chlorine if the halogen is chlorine or 0.5 to 55 weight percent bromine if the halogen is bromine.

13. A method as defined in claim 4 where the halogenating agent is a mixture of CH$_e$X$_f$ and a free radical initiator where e is 0 or 1, f is 3 or 4, the sum (e+f) is 4, and X is chlorine or bromine and the halogenated polycarbosilanes contains 0.5 to 35 weight percent chlorine if the halogen is chlorine or 0.5 to 55 weight percent bromine if the halogen is bromine.

14. A method as defined in claim 13 where CH$_e$X$_f$ is CCl$_4$ and the free radical initiator is benzoyl peroxide.

15. A method of preparing a R' radical-containing polycarbosilane, which method consists of reacting under anhydrous conditions, a halogenated polycarbosilane with a reagent or mixture of reagents selected from the group consisting of Grignard reagents having the general formula R'MgX' and organolithium compounds having the general formula R'Li where X' is chlorine, bromine, or iodine and R' is an alkyl radical containing 1 to 20 carbon atoms, a vinyl radical, or a phenyl radical, at a temperature of 0° to 120° C., in a solvent in which the halogenated polycarbosilane is soluble and which does not react with the halogenated polycarbosilane, and thereafter recovering the R' radical-containing polycarbosilane.

16. A method as defined in claim 15 where the halogenated polycarbosilane is prepared by treating a polycarbosilane with a halogenating agent selected from the group consisting of chlorine, bromine, PCl$_5$, PBr$_5$, SbCl$_5$, N-chlorosuccinimide, N-bromosuccinimide, SOCl$_2$, and mixture of CH$_e$X$_f$ and a free radical initiator where e is 0 or 1, f is 3 or 4, the sum (e+f) is 4, and X is chlorine or bromine, where the polycarbosilane contains at least 0.1 weight percent Si-H groups, and where the halogenated polycarbosilane contains 0.5 to 35 weight percent halogen if the halogen is chlorine or 0.5 to 55 weight percent halogen if the halogen is bromine.

17. A method as defined in claim 16 where R' is a methyl radical.

18. A method as defined in claim 16 where R' is a vinyl radical.

19. A method as defined in claim 16 where R' is a phenyl radical.

20. A method as defined in claim 16 where the halogenated polycarbosilane is reacted with a mixture of reagents where R' in one reagent is a methyl radical and in a second reagent R' is a vinyl radical.

21. A method as defined in claim 16 where the halogenated polycarbosilane is reacted with a mixture of reagents where R' in one reagent is a vinyl radical and in a second reagent R' is a n-octyl radical.

22. A method as defined in claim 16 where the halogenated polycarbosilane is reacted with a mixture of reagents where R' in one reagent is a vinyl radical and in a second reagent R' is a n-dodecyl radical.

23. A R' radical-containing polycarbosilane as prepared by the method of claim 17.

24. A R' radical-containing polycarbosilane as prepared by the method of claim 20.

25. A R' radical-containing polycarbosilane as prepared by the method of claim 22.

26. A method of preparing a R"O— or RO-containing polycarbosilane, which method consists of reacting under anhydrous conditions, a halogenated polycarbosilane with a reagent selected from the group consisting of (i) carbinols having the general formula R"OH, (ii) alcoholates having the general formula R"OM, and (iii) alkyl orthoformates having the general formula $(RO)_3CH$ wherein R" is a alkyl radical containing 1 to 4 carbon atoms or a phenyl radical, R is an alkyl radical containing 1 to 4 carbon atoms, and M is sodium, potassium, or lithium, at a temperature of 0° to 110° C., in a solvent, in which the halogenated polycarbosilane is soluble and which does not react with the halogenated polycarbosilane, and thereafter recovering the R"O— or RO-containing polycarbosilane.

27. A method as defined in claim 26 where the halogenated polycarbosilane is prepared by reacting a polycarbosilane with a halogenating agent selected from the group consisting of chlorine, bromine, $PCl_5$, $PBr_5$, $SbCl_5$, N-chlorosuccinimide, N-bromosuccinimide, $SOCl_2$, and mixtures of $CH_eX_f$ and a free radical initiator where e is 0 or 1, f is 3 or 4, the sum (e+f) is 4, and X is chlorine or bromine, where the polycarbosilane contains at least 0.1 weight percent Si-H groups, and where the halogenated polycarbosilane contains 0.5 to 35 weight percent halogen if the halogen is chlorine or 0.5 to 55 weight percent halogen if the halogen is bromine.

28. A method as defined in claim 27 where R" and R are methyl radicals.

29. A R"O— or RO-containing polycarbosilane as prepared by the method of claim 26.

30. A R"O— or RO-containing polycarbosilane as prepared by the method of claim 28.

31. A method of preparing a $R'''_2N$-containing polycarbosilane, which method consists of reacting under anhydrous conditions, a halogenated polycarbosilane with an aminolysis reagent having the general formula $NHR'''_2$ wherein R''' is hydrogen, an alkyl radical containing 1 to 4 carbon atoms, a phenyl radical or a —Si-$R^{iv}_3$ radical wherein $R^{iv}$ is an alkyl radical containing 1 to 4 carbon atoms, a vinyl radical, or a phenyl radical, at a temperature of from 25° to 100° C., in a solvent in which the halogenated polycarbosilane is soluble and which does not react with the halogenated polycarbosilane, and thereafter recovering the $R'''_2N$-containing polycarbosilane.

32. A method as defined in claim 31 where the halogenated polycarbosilane is prepared by reacting a polycarbosilane with a halogenating agent selected from the group consisting of chlorine, bromine, $PCl_5$, $PBr_5$, $SbCl_5$, N-chlorosuccinimide, N-bromosuccinimide, $SOCl_2$, and mixtures of $CH_eX_f$ and a free radical initiator where e is 0 or 1, f is 3 or 4, the sum (e+f) is 4, and X is chlorine or bromine, where the polycarbosilane contains at least 0.1 weight percent Si-H groups, and where the halogenated polycarbosilane contains 0.5 to 35 weight percent halogen if the halogen is chlorine or 0.5 to 55 weight percent halogen if the halogen is bromine.

33. A method as defined in claim 32 where the aminolysis reagent is $NH_3$.

34. A method as defined in claim 32 where the aminolysis reagent is $CH_3NH_2$.

35. A $R'''_2N$-containing polycarbosilane as prepared by the method of claim 31.

36. A $R'''_2N$-containing polycarbosilane as prepared by the method of claim 33.

37. A $CH_3NH$-containing polycarbosilane as prepared by the method of claim 34.

* * * * *